(12) United States Patent
Goncharuk et al.

(10) Patent No.: US 12,038,321 B2
(45) Date of Patent: Jul. 16, 2024

(54) DETECTING SEISMIC EVENTS USING MULTISPAN SIGNALS

(71) Applicant: X Development LLC, Mountain View, CA (US)

(72) Inventors: Artem Goncharuk, Mountain View, CA (US); Kevin Forsythe Smith, Pleasanton, CA (US); Valey Kamalov, Gainesville, FL (US); Mattia Cantono, Santa Clara, CA (US); Rafael Muller, Toronto (CA)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 18/048,127

(22) Filed: Oct. 20, 2022

(65) Prior Publication Data

US 2023/0120850 A1     Apr. 20, 2023

Related U.S. Application Data

(60) Provisional application No. 63/257,866, filed on Oct. 20, 2021.

(51) Int. Cl.
*G01H 9/00* (2006.01)
*G01V 1/01* (2024.01)
(Continued)

(52) U.S. Cl.
CPC .............. *G01H 9/004* (2013.01); *G01V 1/01* (2024.01); *G01V 1/226* (2013.01); *G01V 1/247* (2013.01); *G01V 1/345* (2013.01)

(58) Field of Classification Search
CPC ........ G01H 9/004; G01V 1/008; G01V 1/226; G01V 1/247; G01V 1/345
See application file for complete search history.

(56) References Cited

U.S. PATENT DOCUMENTS 9,767,700 B1 * 9/2017 Vander Lind ........ G05D 1/0866
9,998,806 B2 * 6/2018 Kamalov ........... H04B 10/2912
(Continued)

FOREIGN PATENT DOCUMENTS

CA      2854124 A1 *  5/2013  ......... G01D 5/35303
CN    110492927        11/2019
(Continued)

OTHER PUBLICATIONS

Marra et al., "Optical interferometry-based array of seafloor environmental sensors using a transoceanic submarine cable," Science, May 20, 2022, 376:874-879 (Year: 2022).*
(Continued)

*Primary Examiner* — Daniel Pihulic
(74) *Attorney, Agent, or Firm* — Fish & Richardson P.C.

(57) ABSTRACT

Systems and methods for detecting a mechanical disturbance are disclosed. One of the method may comprise the operation steps including: transmitting, by a transmitter, a pulse at a preset frequency along a first cable; receiving, by a receiver, a plurality of signals, wherein each of the plurality of signals travels along the first cable and a second cable connected to the receiver for a corresponding span; calculating one or more differential phases, wherein each differential phase is calculated based on respective phases and the corresponding spans of two of the plurality of signals; and determining a localization of the mechanical disturbance based on the one or more differential phases.

20 Claims, 4 Drawing Sheets

(51) Int. Cl.
  *G01V 1/22*    (2006.01)
  *G01V 1/24*    (2006.01)
  *G01V 1/34*    (2006.01)

(56) References Cited

U.S. PATENT DOCUMENTS

| | | | |
|---|---|---|---|
| 10,277,319 B2 * | 4/2019 | Steinkraus | H04B 10/118 |
| 2016/0146662 A1 | 5/2016 | Stokely et al. | |
| 2016/0191163 A1 * | 6/2016 | Preston | G01B 11/161 398/16 |
| 2021/0231467 A1 | 7/2021 | Awwad et al. | |
| 2023/0120850 A1 * | 4/2023 | Goncharuk | G01H 9/004 367/14 |

FOREIGN PATENT DOCUMENTS

| | | | |
|---|---|---|---|
| CN | 112747815 A * | 5/2021 | |
| WO | WO-2023069586 A1 * | 4/2023 | G01H 9/004 |

OTHER PUBLICATIONS

International Search Report and Written Opinion in International Appln. No. PCT/US2022/04 7227, dated Jan. 31, 2023, 12 pages.

Jousset et al., "Dynamic strain determination using fibre-optic cables allows imaging of seismological and structural features," Nature Communications, Jul. 3, 2018, 9(1):1-11.

Marra et al., "Optical interferometry-based array of seafloor environmental sensors using a transoceanic submarine cable," Science, May 20, 2022, 376:874-879.

Marra et al., "Ultrastable laser interferometry for earthquake detection with terrestrial and submarine cables," Science, Jun. 14, 2018, 361(6401):486-490.

Zhan et al., "Optical polarization-based seismic and water wave sensing on transoceanic cables," Science, Feb. 26, 2021, 371(6532):931-936.

Zhu et al., "PhaseNet: A Deep-Neural-Network-Based Seismic Arrival Time Picking Method," Geophysical Journal International, Jan. 2019, 216(1):261-273.

* cited by examiner

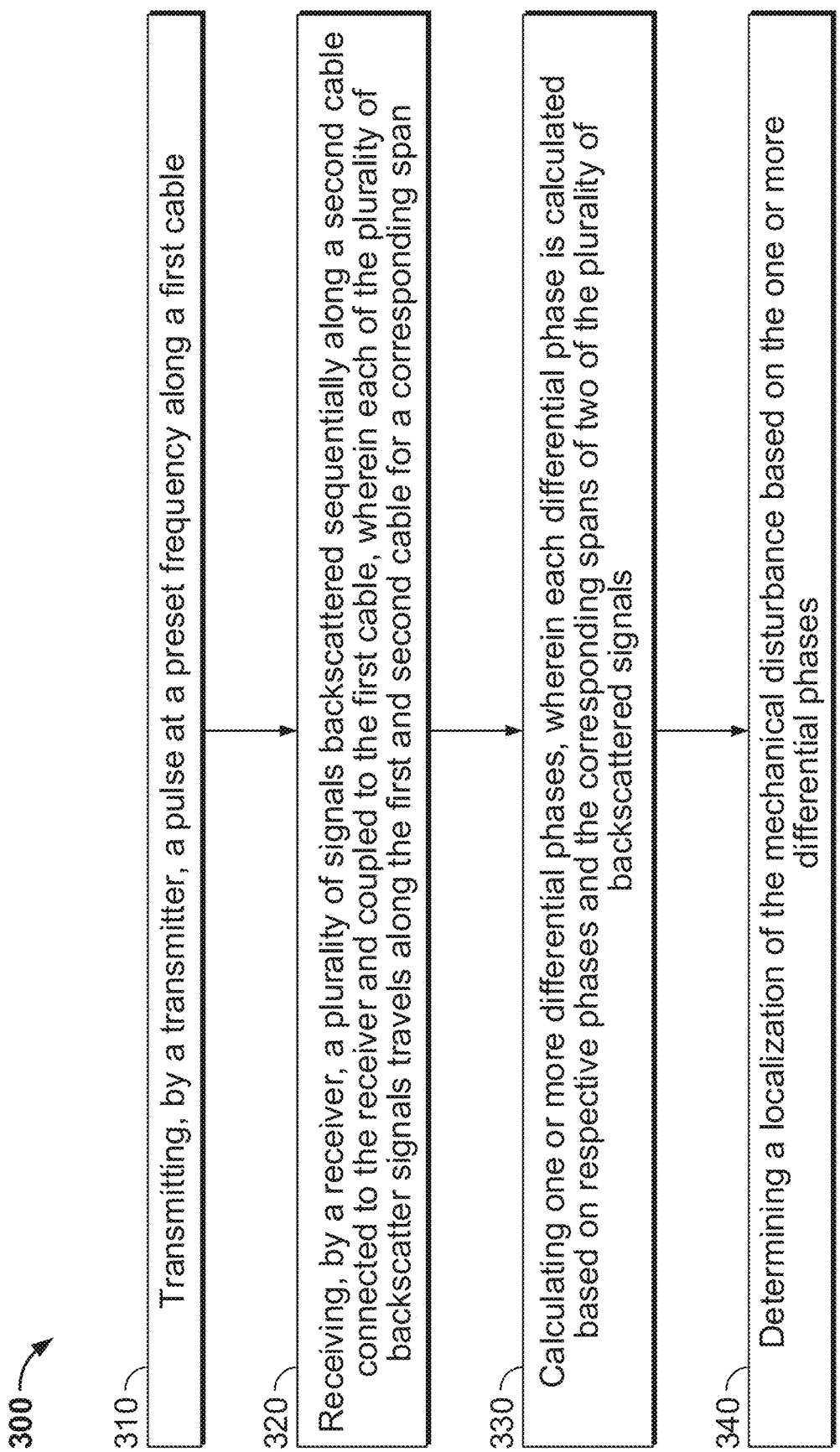

DETECTING SEISMIC EVENTS USING MULTISPAN SIGNALS

CROSS-REFERENCE TO RELATED APPLICATION

This application claims the benefit under 35 U.S.C. § 119(e) of U.S. Patent Application No. 63/257,866, entitled "Detecting Seismic Events Using Multispan Signals," filed Oct. 20, 2021, which is incorporated herein by reference in its entirety.

TECHNICAL FIELD

This disclosure generally relates to detecting and localizing mechanical disturbances using signals backscattered from multiple spans of a cable.

SUMMARY

This disclosure describes a system, method, and media for detecting and localizing mechanical disturbance, e.g., disturbance caused by earthquakes or tsunamis, using signals that travel from multiple spans of a cable. When a mechanical disturbance occurs, seismic waves can be generated and propagate to a subsurface or surface-laid cable, thereby altering characteristics, e.g., phase information, of the signal traveling along the cable. After receiving the signals that looped back at a receiver, differential phases between two signals can be calculated. Monitoring of the differential phases and their changes over time can be used to detect and localize the mechanical disturbances.

In an example implementation, a transmitter can transmit a pulse at a preset frequency along a first cable. The first cable can be coupled to a second cable, and then connected to a receiver. Alternatively, the first cable and the second cable can be a same cable with two different signal pathways allowing signals to travel in different directions. The pulse can travel along the first cable, become a plurality of signals that backscatters, reflects, or otherwise travels along different spans from the first cable to the second cable, and the signals can then be received by the receiver. The signals may arrive at the receiver with different time delays and they may exhibit different characteristics, e.g., phase, polarization, intensity, etc., from each other. Such differences can be caused by the different spans they traveled along and by mechanical disturbances that may propagate to different spans at different time points and locations.

After the signals are received, one or more differential phases between two of the plurality of signals can be calculated based on respective phases and the corresponding spans of the two signals. The calculation can be repeated for each pulse transmitted, and the differential phases can be monitored over time. The differential phases can be used to determine a location of the mechanical disturbance.

In an aspect combinable with the example implementation, the first and second cable can comprise fiber optic cables, and the pulse can comprise a light pulse followed by a train of pulses, and the plurality of signals can comprise Rayleigh backscattered light signals.

In an aspect combinable with any one of the previous aspects, the mechanical disturbance can generate seismic waves that propagate to the first cable or the second cable.

In an aspect combinable with any one of the previous aspects, the pulse at the preset frequency can travel simultaneously with other signals along the first cable, the second cable, or both, and the other signals can be at one or more frequencies different from the preset frequency.

In an aspect combinable with any one of the previous aspects, determining the localization of the mechanical disturbance can comprise determining the localization of the mechanical disturbance based on the one or more differential phases and based on at least one of intensities of the plurality of signals or polarizations of the plurality of signals.

In an aspect combinable with any one of the previous aspects, the method can further comprise separating the plurality of signals travelled sequentially along the second cable based on one or more delays between the plurality of signals caused by the corresponding spans. In an aspect combinable with any one of the previous aspects, calculating the one or more differential phases comprises: extracting a corresponding phase from each of the plurality of signals; and obtaining the one or more differential phases based on the extracted corresponding phases. In an aspect combinable with any one of the previous aspects, each of the one or more differential phases is calculated based on comparison of a phase of the transmitted pulse and a phase of one of the plurality of signals. In an aspect combinable with any one of the previous aspects, the receiver is a coherent receiver, and the comparison of the phase of the transmitted pulse and the phase of one of the plurality of signals is by performing digital signal processing by the coherent receiver.

In general, innovative aspects of the subject matter described in this specification can be embodied in methods that include the actions of using differential phases of the signal from multiple spans to detect and localize mechanical disturbances. Other implementations of this aspect include corresponding systems and computer programs configured to perform the actions of the methods that are encoded on computer storage devices.

Example implementations according to the present disclosure can include one, some, or all of the following advantages. For example, example implementations can solve the earthquake localization problem by using measurements of phase of light pulses over a cable. The example implementations can provide more reliable and sensitive detection and localization of earthquake and tsunamis by using differential phases of signals from multiple spans than existing technologies using intensity and/or polarization of the signals. The example implementations, by continuously monitoring information sensitive to mechanical disturbance, e.g., phase, can utilize undersurface or surface-laid cable(s) as if sensors were distributed along the cable(s) for detecting and localizing earthquakes, tsunamis, and other sources of mechanical disturbances with a time resolution on the order of 0.1 seconds and a space resolution on the order of 100 kilometers using existing laser technologies. The example implementations can also utilize existing undersurface or surface-laid fiber optic cables without interference with other functions of the existing cables, thereby reducing costs and time associated using the disclosed methods and systems herein for detecting and localizing earthquakes and tsunamis.

The details of one or more implementations of the subject matter described in this disclosure are set forth in the accompanying drawings and the description below. Other features, aspects, and advantages of the subject matter will become apparent from the description, the drawings, and the claims

DESCRIPTION OF DRAWINGS

FIG. 3 is a flowchart describing an example method for detecting and localizing mechanical disturbances.

DETAILED DESCRIPTION

This disclosure describes a system and method for detecting and localizing a subsurface mechanical disturbance using differential phases of signals traveling along multiple spans. When a mechanical disturbance occurs, seismic waves can be generated and propagate to a cable, e.g., a submarine cable, thereby altering phase information of the signal traveling along the cable, e.g., optical signal, alone or in combination with alteration in other characteristics of the signal. After receiving the signals, differential phases between two signals can be calculated, and monitoring of the differential phases and their changes in time can be used to detect and localize mechanical disturbance. The signals can include Rayleigh backscattering, back reflection, or otherwise propagation along the cable(s), and signals from adjacent spans can be used to calculate a differential phase. In some cases, the differential phases can be very sensitive to mechanical disturbances, and monitoring the differential phases over time can allow more accurate and reliable detection and localization than existing systems and methods, e.g., existing systems and methods that rely on intensity or polarization of signals. After extracting the differential phase of the signal and monitoring over time for differential phases, the system and method here can generate a time-space signal with a predetermined sampling speed and spatial resolution. This can be considered as an array sensor along the cable and can be used to detect and localize mechanical disturbance, e.g., caused by earthquakes and tsunamis, using existing localization techniques.

Figure 1:
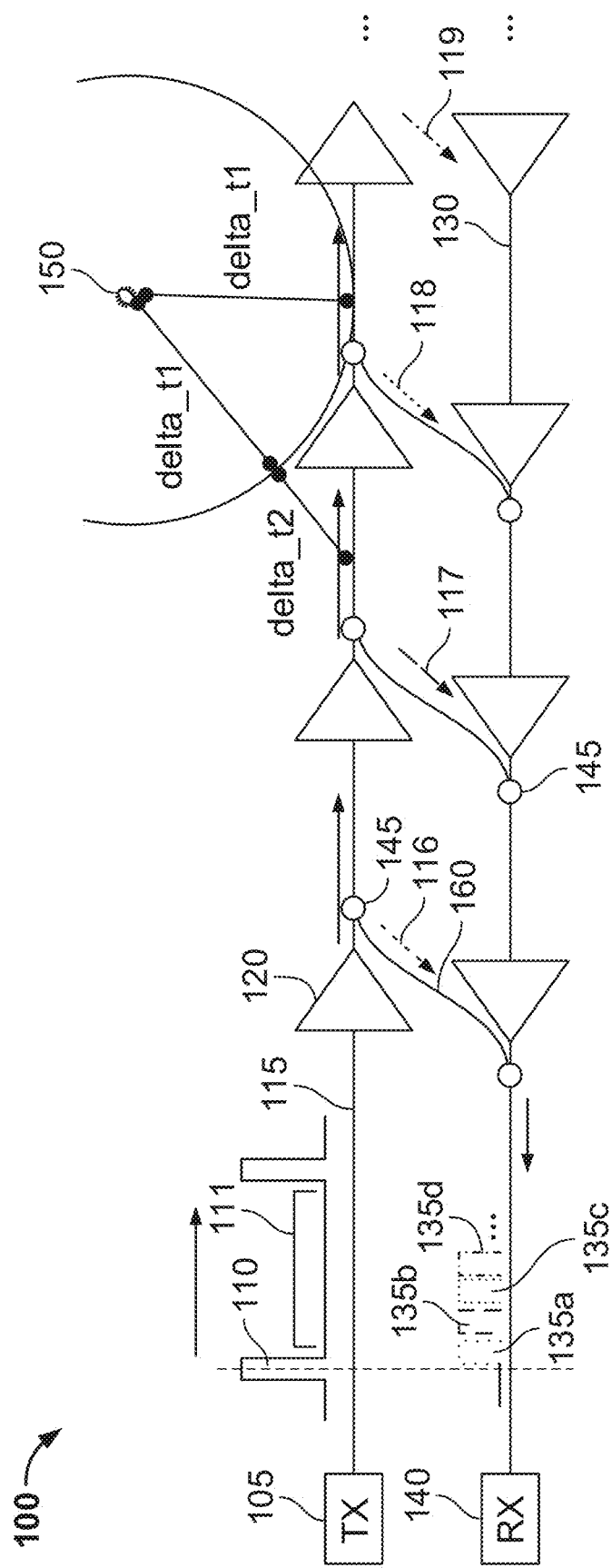
FIG. 1 depicts an example implementation of at least a portion of a system for detecting and localizing mechanical disturbances.

Turning to the illustrated example implementation, FIG. 1 is a schematic diagram illustrating an example system 100 for localizing and detecting subsurface mechanical disturbances. The system 100 includes a transmitter 105, which can generate pulses 110. The transmitter 105 can be manually or automatically controlled to generate a predetermined pulse 110 or pulse train. The transmitter 105 can transmit the pulse 110 or pulse train along a first cable 115 connected thereto. The transmitter 105 can be any existing electromagnetic pulse generator/transmitter. The transmitter 105 can be any optic pulse generator/transmitter. The transmitter 110 can generate and transmit pulses 110 or pulse trains with specified parameters. Such specified parameters can include but are not limited to a frequency, bandwidth, time profile, phase, polarization, intensity, magnitude, signal to noise ratio, and period. The pulse 110 can be but is not limited to a rectangular shape as shown in FIG. 1. The pulse may include different pulse shapes such as a bell shape or a Gaussian shape.

The pulse train can include multiple identical pulses with a fixed time gap 111 between two adjacent pulses. The fixed time gap 111 between two adjacent pulses can be predetermined. In some embodiments, the fixed time gap 111 can be predetermined based on the round-trip time of the pulse from the transmitter 105 to the receiver 140. For example, assuming full length propagation of the pulse 110 that uses about 0.1 seconds for traveling 104 kilometers, the time gap can be equal to or greater than the time duration for a pulse to travel from the transmitter 105 along the first cable 115 and the second cable 130 and back at the receiver 140. As another example, the time gap 111 can be predetermined so that the signal 135a is not overlapped with its adjacent signal 135b when they arrive at the receiver 140. In some embodiments, the fixed time gap 111 can be calculated based on the corresponding span, e.g., that each of the pulses travel from the transmitter 105 to the receiver 140.

The width of the pulse, e.g., in the time domain, can be based on the span length. For example, the width of the pulse can be in the range of 1 microsecond to 100 microseconds if the span length is on the order of 100 kilometers.

In some cases, the pulse 110 or pulse train can be any signal that can scatter along a first cable 115 connected to the transmitter 105 and then to a second cable 130 and back at a receiver 140. In some cases, the pulse 110 or pulse train can include an electromagnetic pulse or pulse train. In some cases, the pulse 110 can comprise a light pulse. The pulse train can be a train of identical light pulses.

The first cable 115 can be connected to the transmitter 105. The first cable 115 can also be coupled with a second cable 130. For example, multiple couplers 145 can connect the first cable 115 and the second cable 130. There is a connection 160 between two couplers 145 that enables propagation of the signal therebetween. There can be signal attenuation associated with the cable(s) 115 130, the coupler 145, and/or the connection 160 between the two couplers. Different pulses 110 may propagate through different connections 160 and different pairs of couplers 145 in its corresponding span. In some embodiments, the connection 160 can include a high loss loopback path.

The first or the second cables 115, 130 can each be fiber optic cables. In some cases, there is only one cable, and the first cable 115 and the second cable 130 can be a different optic fiber within the same cable. In some cases, the first and the second cable are different in a sense that the signal travels in a first direction in the first cable while in a second direction in the second cable. In some cases, there are only two cables in the system 100. In some cases, there are more than two cables, e.g., 3, 4, 6, or any other number, that are connected with the first and/or second cable 115 130 to form signal transmission pathway(s) from the transmitter 105 to the receiver 140.

The first cable 115 or second cable 130 can include one or more fiber threads to achieve a preset precision or sensitivity of detecting or locating the mechanical disturbance. The first and the second cable 115 130 can enable pulses 110 or pulse trains to propagate therealong in parallel with other signals without interferences to each other. For example, the pulses 110 or pulse trains can be at a preset frequency or frequency range that is different from frequencies of other signals traveling on the same cables 115 130, so that the interferences between signals are minimized or eliminated.

As another example, the pulses 110 may be of two or more frequencies that do not interfere with other signals traveling along the same cables. For example, using pulses at two frequencies may result in an increase of signal to noise ratio thereby increasing the accuracy and/or sensitivity of the detection and localization of the mechanical disturbance. In some embodiments, some or all portions of the first cable or the second cable can be located undersurface. In some embodiments, some or all portions of the first cable or the second cable can be laid on the ground or surface.

The first cable 115 and the second cable 130 may include multiple signal amplifiers 120. The signal amplifier 120 can be any existing amplifier that provides a preset amplification range to compensate for signal attenuation caused by the cable(s) 115 130, the coupler 145, and/or the connection 160. The amplifiers 120 can be positioned with a fixed distance between two adjacent amplifiers 120. In some cases, the amplifier 120 can be placed in proximity to a coupler 145 so that the signal is amplified before it is attenuated by the coupler(s) 145. In some embodiments, the location of the amplifier 120, the amplification, or both are determined based on the allowable attenuation of the signals 135a, 135b, 135c, 135d.

When a mechanical disturbance 150 occurs, it can generate seismic waves(s) that propagate to one or more different locations of the first cable 115 or the second cable 130. For example, the seismic waves may propagate with a first time delay, delta_t1, to a first location of the first cable 115. The mechanical disturbance 150 may also propagate with a different time delay, (delta_t1+delta_t2), to a second location of the first cable 115. As a result, the propagated mechanical disturbance may affect signal(s) traveling through one or more spans, e.g., span(s) including certain connections 118-119 between the first and the second cable, but not other signals traveling through connections 116-117. The characteristics of the signal(s) can be changed by the propagated mechanical disturbance, such as its intensity, magnitude, polarization, phase, or their combinations, comparing with unaffected signals if the unaffected signals were to travel along the same span. When the signals, unaffected 135a, 135b, and affected 135c 135d are received at the receiver 140, they are separated. The changes in their characteristics can then be used to calculate where the mechanical disturbance originated and when it occurred. Such calculation can be based on the known information of the mechanical disturbance, such as the speed, direction, or pattern (or combination thereof) of how the mechanical disturbance propagates.

The number of spans may be limited by the degree of attenuation of the signal received at the receiver 140. For example, in order to maintain a signal power/intensity of the signal for accurate signal processing, the number of spans may be limited to be no more than, 4, 8, 10, or any other numbers. In some embodiments, the multiple spans can include only two spans.

In some cases, the mechanical disturbance 150 can be caused by any abnormal event that may result in a physical perturbation, e.g., a pressure change in a subsurface area in proximity to the cable(s). The subsurface area can be underground or sub-oceanic. The mechanical disturbance can be caused by natural phenomena such as an earthquake, a tsunami, a hurricane, and/or a volcano eruption. In some cases, the mechanical disturbance can be caused by human interventions such as infrastructure breakage, e.g., construction, mining, poaching, a leaky pipe, and/or $CO_2$ injection. In some embodiments, the mechanical disturbance can be any source that generates seismic wave(s).

The receiver 140 can include a coherent receiver that receives the signal with improved sensitivity than traditional receivers. At the receiver 140, the signals from multiple spans 135a, 135b, 135c can be separated in time, e.g., using a demultiplexer of the receiver 140. The receiver 140 may be configured to generate a moving average of the received power of the signals. Such moving average can be used to track intensity fluctuation of the signal within a signal or among signals of different spans.

The receiver 140 may include a digital signal processing unit that calculates the polarization and/or the phase of each signal. For example, the digital signal processing unit may include a laser that can be used in current telecommunication transponders for calculating and tracking the polarization.

The digital signal processing unit can process signals at a high speed in the range of 100 Megasamples per second (MSa/s) to 100 Gigasamples/second (GSa/s). For example, the digital signal processing unit can process signals with 2 GSa/s speed.

Characteristics of signals from different spans can be used to indicate a span or a portion of the span that is closer to the location of disturbance than other spans. Such characteristics can include a phase, an intensity, a polarization of a single span, or differential phase, intensity, or polarization between adjacent spans. Knowledge of seismic waves can be used in combination with the characteristics of the signal(s) for detection and localization of the disturbance. For example, after the signals 135a 135b 135c 135d are received and demultiplexed at the receiver 140. Each of the signals can be sampled or extracted, e.g., over a predetermined time duration that allows the signal to travel part or all of its corresponding span, at a predetermined sampling rate, thereby generating a sampled phase in the time domain with discrete phase value at sampling time points. Each sampled phase can be compared with the reference phase of the transmitted pulse to generate a processed phase corresponding to its span. Such processed phase can then be used for generating differential phases. For example, the processed phase can be further integrated over the predetermined time duration and then compared with a correspondingly processed phase from another span. Alternatively, the processed phase can be directly compared with corresponding processed phase of another span to generate the differential phases. The comparison can include but is not limited to determining phase change at matching time point(s), relative phase fluctuation within the time duration, and phase correlation properties. Differential phase, polarization, intensity, or their combinations can be obtained by taking the difference between the processed phases of two adjacent spans, e.g., adjacent in time when arrived at the receiver. Such differential phases can indicate span 135c and 135d are located closer to the disturbance than any other spans.

Processing of the signals 135a 135b 135c 135d can be repeated for signals corresponding to each pulse of a pulse train transmitted by the transmitter. For example, with a continuous pulse train with a time delay of 0.1 seconds between adjacent pulses, and multiple spans with a span length on the order of 100 kilometers (e.g., less than 10 spans) covering a subsurface area, a time-space detection signal with a sampling speed on the order of 0.1 seconds and a spatial resolution on the order of 100 kilometers monitoring a particular area can be obtained. This can be viewed as an array sensor covering the area and can be used to detect and localize mechanical disturbance along a time dimension. As a result, mechanical disturbance can be detected with a time resolution on the order of 0.1 seconds and a spatial resolution on the order of 100 kilometers. Such time and/or spatial resolution can be adjusted by changing pulse width a span length and/or a time delay between pulses in the pulse train.

Figures 2A, 2B, 2C:
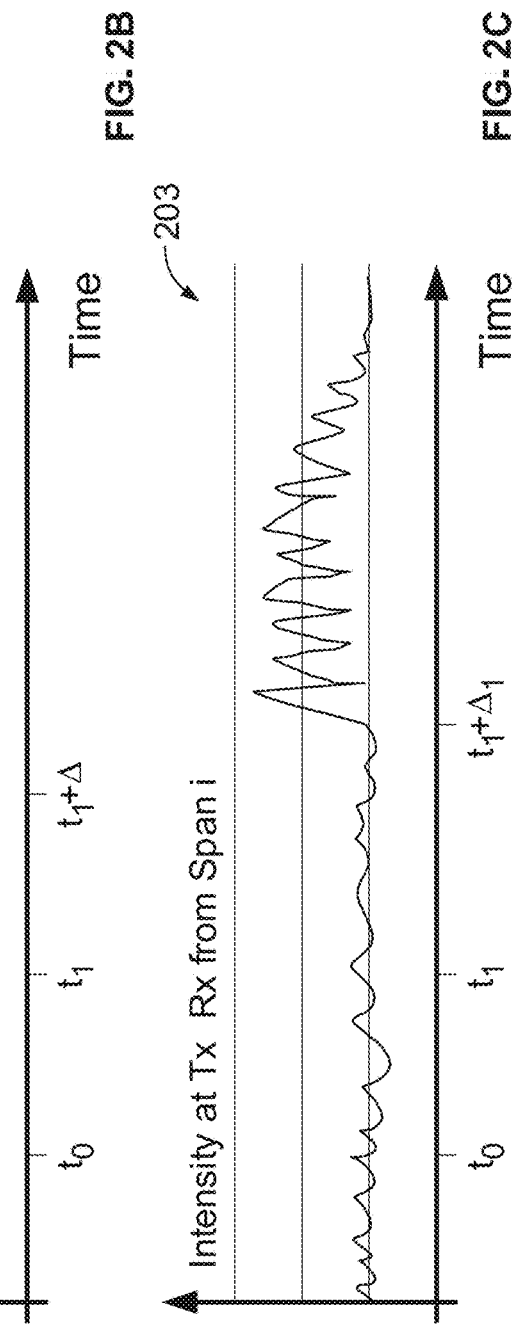
FIGS. 2A, 2B and 2C are examples of signals traveled from different spans.

FIGS. 2A-2C are example signals received at the receiver in association with the detection of an earthquake. The earthquake starts at a time point, t1, and lasts for about 30 seconds. The seismic wave(s) of the earthquake can first propagate to span i+1, and the intensity of the signal at span i+1 201 is increased comparing with the intensity before the earthquake. The seismic wave(s) can then reach two other spans, i.e., i+2 and i, with different delays. The intensities of the signals at span i+2 202 and at span i 203 were also increased when compared with the corresponding intensities before the earthquake. The intensity change, i.e., intensity before and during the earthquake, is different at different spans. Further, another intensity difference, i.e., intensity during the earthquake among different spans, can be caused due to the different locations and/or timings of the seismic wave(s) reaching at the different spans. Such intensity differences can be used to calculate location and time that the earthquake occurred.

Similarly, information about polarization and phase of the signals can also be used, either alone, or in combination with other information to calculate characteristics of the earthquake.

For phase detection, a laser that maintains a preset phase stability on the order of 10000 kilometers is challenging. The disclosed subject matter herein advantageously utilizes relative phase between signals, e.g., differential phases from adjacent spans, to reduce the need to maintain phase stability of individual signals in a span. With the disclosed subject matter herein, the requirement for the coherence length of the laser can be significantly reduced to the order of 100 kilometers. Such phase coherence length can be achieved by using commercially available technologies. Implementations according to the present disclosure can use lasers with a coherence length on the order of 100 kilometers for transmitting the pulses or pulse trains.

FIG. 3 is a flowchart describing an example method for detecting and localizing a mechanical disturbance. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 310, a pulse at a predetermined frequency is transmitted by a transmitter to propagate along a first cable. The pulse can include but is not limited to a light pulse. For example, the transmitter can include a laser with a coherent length on the order of 100 kilometers. The predetermined frequency can be used to avoid interferences with other signals propagating at the same time within the same cable. The pulse can be repeatedly transmitted by the transmitter so that it forms a pulse train with a fixed time delay between two adjacent pulses. The time profile of the pulse can be tailored to be noise or artifact resistant. The first cable can include but is not limited to a fiber optical cable. In some cases, transmitting the pulse at the preset frequency along the first cable includes performing phase, frequency, polarization, amplitude modulation, or a combination thereof to distinguish back-reflected signal from the background of noise, e.g., coming from Erbium-Doped Fiber Amplifiers (EDFA). Correspondingly, the receiver can include demodulation(s) to improve signal to noise ratio of the back-reflected signals received therein.

At 320, a plurality of signals can backscatter, be reflected, or otherwise propagate sequentially from the first cable to a second cable coupled to the first cable, and then to the receiver connected to the second cable. Each of the plurality of signals can travel along the first and second cable for a corresponding span. Each span may include a different total distance that the corresponding signal travels from the transmitter to the receiver. Each span may include one or more different connections between the first and the second cable that the corresponding signal propagates therethrough. Two adjacent spans are the corresponding spans for respective signals that arrive adjacent in time at the receiver. The signals can include Rayleigh backscattered light pulses. The signals can include signals that are looped back to the receiver. The signals can include back-reflected signals, e.g., reflected by optic fiber splices or mirrors installed on the first cable and/or the second cable. The signals may be amplified by one or more amplifiers along the first and second cable.

At 330, one or more differential phases can be calculated based on the received signals. Each differential phase can be calculated based on respective phases and the corresponding spans of two of the plurality of signals. For example, each of the signals can be sampled or extracted at the receiver, e.g., over a predetermined time duration that allows the signal to travel part or all of its corresponding span, at a predetermined sampling rate, thereby generating a sampled phase in the time domain. Each sampled phase can be compared with the reference phase of the transmitted pulse to generate a processed phase corresponding to its span. Such processed phase can then be used for generating differential phases. For example, the processed phase can be further integrated over the predetermined time duration and then compared with a correspondingly processed phase from another span. Alternatively, the processed phase can be directly compared with corresponding processed phase of another span to generate the differential phases. The comparison can include but is not limited to determining phase change at matching time point(s), relative phase fluctuation within the time duration, and phase correlation properties.

At 340, a location of the mechanical disturbance can be determined based on the one or more differential phases. Time-space correlation of the differential phases can be used for detection and localization of the mechanical disturbance.

For example, the transmitter may transmit a pulse train with identical pulses separated by fixed time gap therebetween, and the differential phase(s) corresponding to each pulse of the pulse train can be calculated. The differential phase(s) can include a signal that changes over time corresponding to a particular spatial location, e.g., 150 in FIG. 1. Similarly, the differential phase(s) can be obtained as a time-space signal, corresponding to different time points at different spatial locations. The different spatial locations can be determined based on locations of corresponding spans. As an example, the time-space signal can include a sampling frequency on the order of 0.1 seconds and a spatial resolution of 100 kilometers. The space can be two dimensional or three-dimensional. The differential phase(s) which includes the time-space signal can be considered as an array of sensors located along the first cable and/or the second cable to detect and localize mechanical disturbance.

Figure 4:
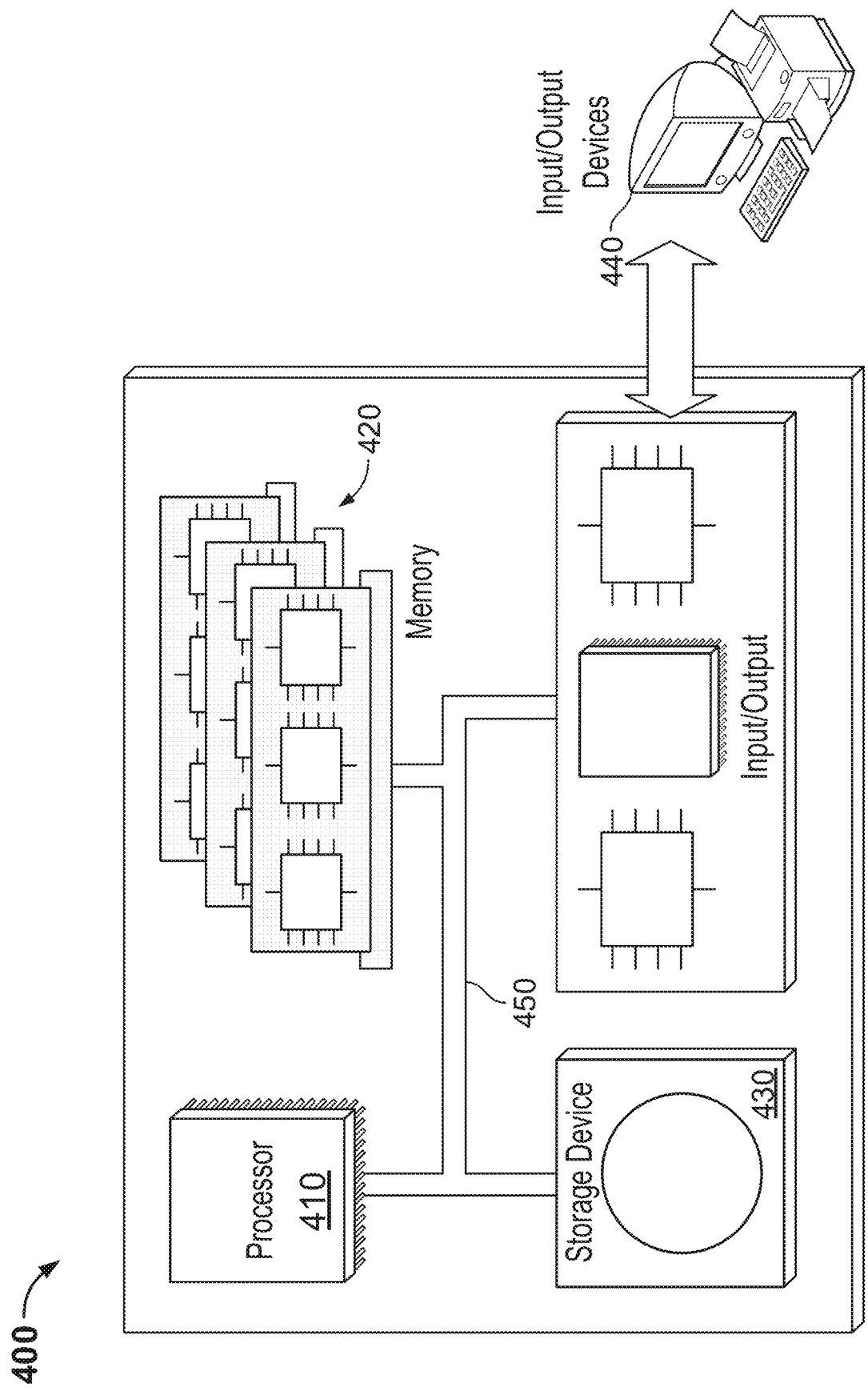
FIG. 4 depicts a computing system for detecting and localizing mechanical disturbances.

FIG. 4 is a schematic diagram of a computer system 400. The system 400 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification and their structural equivalents, or in combinations of one or more of them. The system 400 is intended to include various forms of digital computers, such as laptops, desktops, workstations, servers, blade servers, mainframes, and other appropriate computers. The system 400 can also include mobile devices, such as personal digital assistants, cellular telephones, smartphones, and other similar computing devices. Additionally, the system can include portable storage media, such as Universal Serial Bus (USB) flash drives. For example, the USB flash drives may store operating systems and other applications. The USB flash drives can include input/output components, such as a wireless transducer or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system, including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). The machine learning model can run on Graphic Processing Units (GPUs) or custom machine learning inference accelerator hardware.

To provide for interaction with a user, the features can be implemented on a computer having a display device such as a CRT (cathode ray tube) or LCD (liquid crystal display) monitor for displaying information to the user and a keyboard and a pointing device, such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any implementations or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for detecting a mechanical disturbance, comprising:
   transmitting, by a transmitter, a light pulse at a preset frequency along a first optic cable simultaneously with one or more second optical signals within the first optic cable;
   receiving, by a receiver, a plurality of signals, wherein each of the plurality of signals travels along the first optic cable and a second optic cable connected to the receiver for a corresponding span;
   calculating one or more differential phases, wherein each differential phase is calculated based on respective phases and the corresponding spans of two of the plurality of signals; and
   determining a localization of the mechanical disturbance based on the one or more differential phases.

2. The method of claim 1, wherein the first optic cable comprises a first fiber optic fiber, the second optic cable comprises a second fiber optic fiber, and the first and second fiber optic fiber are comprised within a same cable, and the light pulse comprises a train of pulses, and the plurality of signals comprises Rayleigh backscattered light signals.

3. The method of claim 1, wherein the mechanical disturbance generates one or more seismic waves that propagates to the first optic cable, the second optic cable, or their combinations.

4. The method of claim 1, wherein the one or more second optical signals are at one or more frequencies different from the preset frequency.

5. The method of claim 1, wherein determining the localization of the mechanical disturbance comprises determining the localization of the mechanical disturbance based on the one or more differential phases and based on at least one of intensities of the plurality of signals or polarizations of the plurality of signals.

6. The method of claim 1, further comprising separating the plurality of signals traveled sequentially along the first optic cable based on one or more time delays between the plurality of signals caused by the corresponding spans.

7. The method of claim 6, wherein calculating the one or more differential phases comprises:
   extracting a corresponding phase from each of the plurality of signals; and
   obtaining the one or more differential phases based on the extracted corresponding phases.

8. The method of claim 1, wherein each of the one or more differential phases is calculated based on comparison of a phase of the transmitted light pulse and a phase of one of the plurality of signals.

9. The method of claim 8, wherein the receiver is a coherent receiver, and the comparison of the phase of the transmitted light pulse and the phase of one of the plurality of signals is by performing digital signal processing by the coherent receiver.

10. The method of claim 1 further comprising:
    generating a plurality of signals that sequentially travel along the first optic cable.

11. A system for detecting a mechanical disturbance, comprising:
    a first and second optic cable;
    a transmitter;
    a receiver; and
    a control system communicably coupled to at least one of the receiver and the transmitter and configured to perform operations comprising:
      transmitting, by a transmitter, a light pulse at a preset frequency along a first optic cable simultaneously with one or more second optical signals within the first optic cable;
      receiving, by a receiver, a plurality of signals, wherein each of the plurality of signals travels along the first optic cable and a second optic cable connected to the receiver for a corresponding span;
      calculating one or more differential phases, wherein each differential phase is calculated based on respective phases and the corresponding spans of two of the plurality of signals; and
      determining a localization of the mechanical disturbance based on the one or more differential phases.

12. The system of claim 11, wherein the first and second optic cable comprise fiber optic cables, and the light pulse comprises a train of pulses, and the plurality of signals comprises Rayleigh backscattered light signals.

13. The system of claim 11, wherein the mechanical disturbance generates one or more seismic waves that propagates to the first optic cable, the second optic cable, or their combinations.

14. The system of claim 11, wherein one or more second optical signals are at one or more frequencies different from the preset frequency.

15. The system of claim 11, wherein determining the localization of the mechanical disturbance comprises determining the localization of the mechanical disturbance based on the one or more differential phases and based on at least one of intensities of the plurality of signals or polarizations of the plurality of signals.

16. The system of claim 11, further comprising separating the plurality of signals backscattered sequentially along the second optic cable based on one or more delays between the plurality of signals caused by the corresponding spans.

17. The system of claim 16, wherein calculating the one or more differential phases comprises:
    extracting a corresponding phase from each of the plurality of signals; and
    obtaining the one or more differential phases based on the extracted corresponding phases.

18. The system of claim 11, wherein each of the one or more differential phases is calculated based on comparison of a phase of the transmitted light pulse and a phase of one of the plurality of signals, and wherein the receiver is a coherent receiver, and the comparison of the phase of the light transmitted pulse and the phase of one of the plurality of signals is by performing digital signal processing by the coherent receiver.

19. A non-transitory computer storage media encoded with computer program instructions that when executed by one or more computers cause the one or more computers to perform operations comprising:

identifying a light pulse at a preset frequency transmitted along a first optic cable, the light pulse traveling simultaneously with one or more second optical signals within the first optic cable;

identifying a plurality of signals traveled sequentially along a second optic cable connected to a receiver and coupled to the first optic cable, wherein each of the plurality of signals travels along the first and second optic cable for a corresponding span;

calculating one or more differential phases, wherein each differential phase is calculated based on respective phases and the corresponding spans of two of the plurality of signals; and determining a localization of the mechanical disturbance based on the one or more differential phases.

20. The non-transitory computer storage media of claim 19, wherein the first and second optic cable comprise fiber optic cables, and the light pulse comprises a train of pulses, and wherein the plurality of signals are Rayleigh backscattered light signals.

\* \* \* \* \*